United States Patent
Aarrestad et al.

(10) Patent No.: US 8,908,004 B2
(45) Date of Patent: Dec. 9, 2014

(54) FLATTENED LIGHT REFLECTION FOR TELEPRESENCE

(75) Inventors: Glenn Robert G. Aarrestad, Oslo (NO); Juli A. Satoh, Clovis, CA (US); Shawn E. Bender, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 13/523,548

(22) Filed: Jun. 14, 2012

(65) Prior Publication Data
US 2013/0335507 A1 Dec. 19, 2013

(51) Int. Cl.
*H04N 7/14* (2006.01)
(52) U.S. Cl.
USPC .................. 348/14.08; 348/14.07; 379/202.01
(58) Field of Classification Search
CPC ............ H04M 3/56–3/569; A47F 3/00–3/007; A47F 10/00–10/06; F21W 2131/402; F21W 2131/406; F21W 2131/407
USPC ................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 7,679,639 B2 | 3/2010 | Harrell et al. | |
| 7,692,680 B2 | 4/2010 | Graham et al. | |
| 7,707,247 B2 | 4/2010 | Dunn et al. | |
| 7,710,450 B2 | 5/2010 | Dhuey et al. | |
| 2009/0123692 A1 | 5/2009 | Kaump | |
| 2010/0302344 A1* | 12/2010 | Large et al. ................ | 348/14.08 |

OTHER PUBLICATIONS

Cisco TelePresence TX9000 Series Data Sheet downloaded May 31, 2012 from http://www.cisco.com/en/US/prod/collateral/ps7060/ps8329/ps12453/data_sheet_c78-702104.pdf.

* cited by examiner

*Primary Examiner* — Hemant Patel

(57) ABSTRACT

Embodiments include a telepresence system operative to carry out a teleconference, a lighting arrangement for a telepresence system operative to carry out a teleconference, and a planar panel having a reflective front surface that includes indentations having variable depth operative such that that when the reflective surface is illuminated by a light source, light is directed towards one or more participants in a telepresence system that is operative to carry out a teleconference.

21 Claims, 12 Drawing Sheets

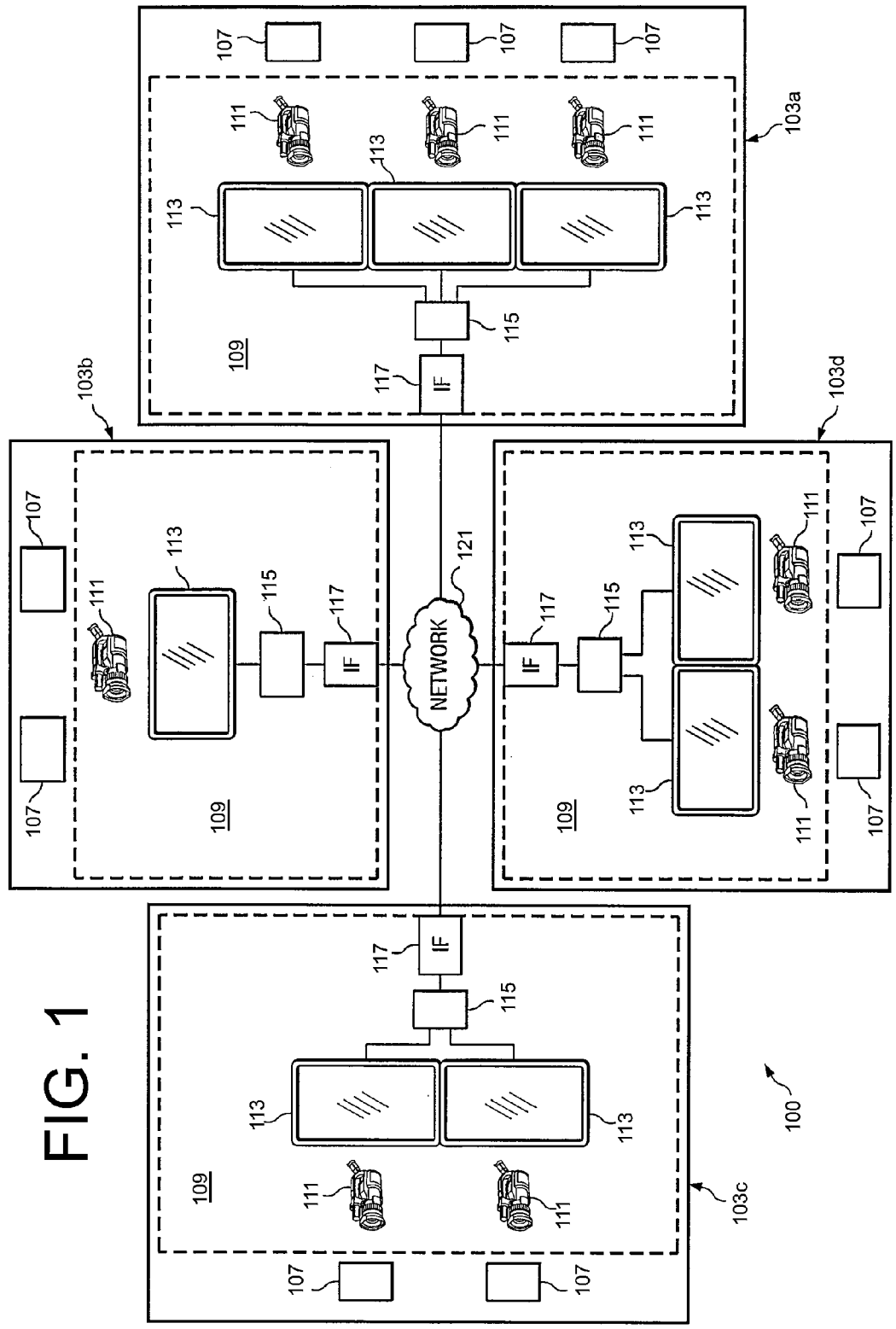

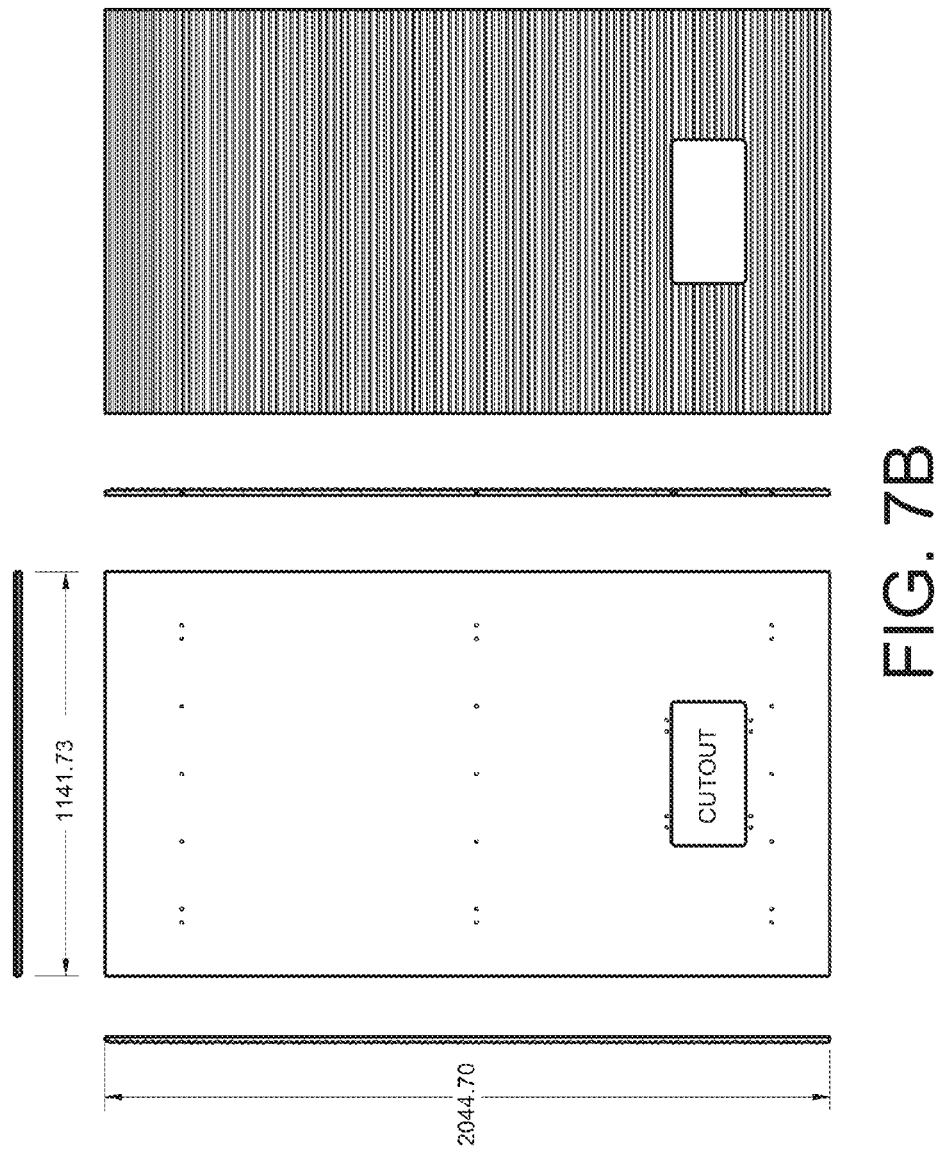

FLATTENED LIGHT REFLECTION FOR TELEPRESENCE

COPYRIGHT & TRADEMARK NOTICES

A portion of the disclosure of this patent document contains material that is subject to copyright protection. The copyright owner has no objection to the facsimile reproduction by any one of the patent document or the patent disclosure, as it appears in the files or records of any patent office in which the disclosure is filed, e.g., the U.S. Patent and Trademark Office, but otherwise reserves all copyrights whatsoever.

Certain marks referenced herein may be trademarks or registered trademarks of third parties. Use of these marks is solely for providing an enabling disclosure by way of example and is not to be construed as limiting the scope of this invention to material associated with such trademarks.

FIELD OF THE INVENTION

The present disclosure relates generally to teleconferencing and in particular to providing lighting for teleconferencing participants.

BACKGROUND

Use of videoconferencing is becoming more and more common. Recently, immersive videoconferencing systems, also called telepresence systems have become available. A telepresence system provides for a high-quality visual and audio conferencing experience that surpasses typical videoconferencing systems. Through a telepresence system, users may experience lifelike, fully proportional (or nearly fully proportional) images in a high definition (HD) virtual table environment. The HD virtual table environment, created by a telepresence system, may help to develop an in-person feel to a visual conference. The in-person feel may be developed not only by near life-sized proportional images, but also by the exceptional eye contact, gaze perspective and location specific sound. The eye gaze may be achieved through the positioning and aligning of the users, the cameras and the display monitors.

One aspect of a videoconferencing system, e.g., a telepresence system is the proper lighting of the participants. Prior art telepresence systems are known to use a light source shining light towards a shroud-like reflector that has a curved surface designed to reflect the light from the light source onto the participants in a desirable way. The use of the curved surface causes the reflector structure to take up a lot of space, and to appear quite massive.

BRIEF DESCRIPTION OF THE DRAWINGS

To provide a more complete understanding of particular embodiments of the present invention and the features and advantages thereof, reference is made to the following description, taken in conjunction with the accompanying drawings, in which:

FIG. 1 illustrates a block diagram illustrating a system for conducting a visual conference between locations using at least one telepresence system, in accordance with a particular embodiment of the present invention;

FIG. 7B shows projective views of an embodiment of the inner right subpanel of a panel with a reflective front surface in accordance with an embodiment of the present invention;

DESCRIPTION OF EXAMPLE EMBODIMENTS

Figure 2A:
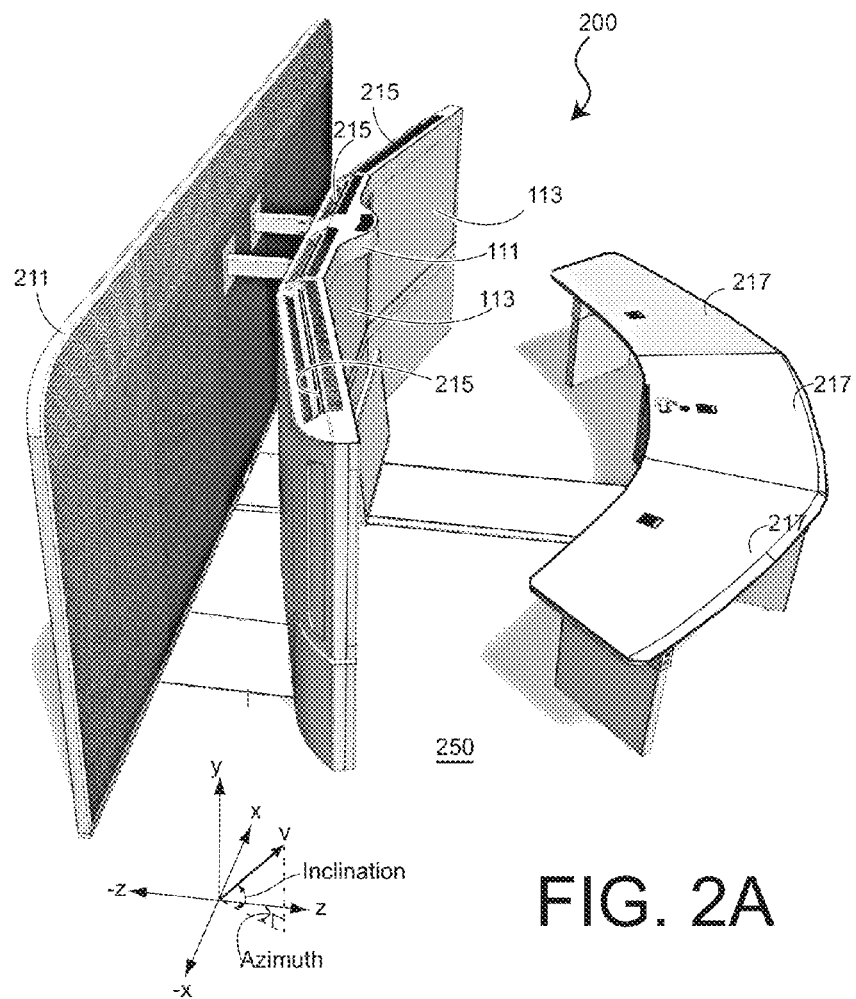
FIG. 2A illustrates a perspective view of an example telepresence system in a space that includes an embodiment of the present invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be used without departing from the principles described herein.

Overview

Embodiments of the present invention include a telepresence system operative to carry out a teleconference. Embodiments of the present invention further include a lighting arrangement for a telepresence system operative to carry out a teleconference. Embodiments of the present invention further include a panel having a reflective front surface that includes indentations having variable depth operative such that that when the reflective surface is illuminated by a light source, light is directed towards one or more participants in a telepresence system that is operative to carry out a teleconference.

One embodiment includes an apparatus comprising a planar panel having a vertical height, a transverse width, and a longitudinal thickness. The planar panel has a rear surface and a reflective front surface. he planar panel is for placement in a space that has a floor, a front, a rear, and sides, and that has a longitudinal horizontal axis from front-to-rear, a transverse horizontal axis perpendicular to the longitudinal horizontal axis, and a vertical axis. The planar panel is for placement parallel to the transverse horizontal axis at a pre-defined distance rearward from a light source positioned in the space at a light source position, including a light source height from the floor. The light source is operative to shine light rearward in a plurality of directions. The reflective front surface includes indentations that are shaped in depth to direct light from the light source frontwards towards one or more participants of a teleconference when the light source and the planar panel are placed in the space, and at least one participant is sitting at a table frontwards of the panel viewing one or more display monitors located between the planar panel and the participants display monitors operative to display respective images to the one or more participants.

One embodiment includes an apparatus comprising a light source for placement in a space. The space has a floor, a front, a rear, and sides. The space has a longitudinal horizontal axis from front-to-rear, a transverse horizontal axis perpendicular to the longitudinal horizontal axis, and a vertical axis. The light source is for placement in the space at a light source position, including a light source height from the floor, the light source when placed in the space operative to shine light rearward in a plurality of directions. The apparatus further comprises a planar panel having a vertical height, a transverse width, and a longitudinal thickness. The planar panel has a rear surface and a reflective front surface and is for placement in the space parallel to the transverse horizontal axis at a pre-defined distance rearward from the light source. The reflective front surface includes indentations that are shaped in depth to direct light from the light source frontwards towards one or more participants of a teleconference when the light source and the planar panel are placed in the space, the participants sitting at a table frontwards of the panel viewing one or more display monitors located between the planar panel and the participants display monitors operative to display respective images to the one or more participants.

One embodiment includes an apparatus comprising one or more display monitors in a space having a floor, a front, a rear, and sides, the space having a longitudinal horizontal axis from front-to-rear, a transverse horizontal axis perpendicular to the longitudinal horizontal axis, and a vertical axis. The apparatus further comprises: a table in front of the one or more monitors arranged such that one or more participants can view the one or more monitors; at least one video camera aimed at the one or more participants; at least one microphone; at least one loudspeaker; an interface to couple the apparatus via a network or other communication link to a remote teleconference system having one or more remote participants; and a processor to control the operation and administration of the apparatus by processing information and signals received from the at least one video camera, at least one microphone, and the interfaces so as to cause the apparatus to operate as a telepresence system operative to carry out a teleconference with the one or remote participants of the remote teleconference system. The apparatus further comprises a light source in the space, the light source at a light source position, including a light source height from the floor, the light source operative to shine light rearward in a plurality of directions. The apparatus further comprises a planar panel having a vertical height, a transverse width, and a longitudinal thickness, the planar panel having a rear surface and a reflective front surface, the planar panel being placed in the space parallel to the transverse horizontal axis at a pre-defined distance rearward from the light source and of the one or more monitors. The reflective front surface includes indentations that are shaped in depth to direct light from the light source frontwards towards the one or more participants sitting at the table viewing the one or more display monitors located between the planar panel and the participants.

In some embodiments, the light source comprises one or more light bars directing light rearward from behind the one or more display monitors, and the indentations comprise vertically stacked horizontal channels having a width in the vertical direction, and a variable depth in the longitudinal direction, the depth varying with height, at least some of the channels differing from channel to channel, the variation of the respective variable depths of the channels that differ from channel to channel calculated to reflect and direct, in inclination, the light from the light source frontwards towards the one or more participants.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION

Embodiments of the present invention include a telepresence system operative to carry out a teleconference. Embodiments of the present invention further include a lighting arrangement for a telepresence system operative to carry out a teleconference. Embodiments of the present invention further include a panel having a reflective surface that includes indentations having variable depth operative such that that when the reflective surface is illuminated by a light source, light is directed towards one or more participants in a telepresence system that is operative to carry out a teleconference.

A System for Conducting Conferences

FIG. 1 is a block diagram illustrating a system 100 for conducting a visual conference between locations using at least one telepresence system. The illustrated embodiment includes a network 121 that facilitates a visual conference between remotely located sites 103 using telepresence equipment 109. Sites 103a, 103b, 103c, and 103d include any suitable number of users 107 that participate in the visual conference. System 100 provides users 107 with a realistic videoconferencing experience even though a local site may have less telepresence equipment 109 than a remote site 103.

Network 121 represents communication equipment, including hardware and any appropriate controlling logic, for interconnecting elements coupled to network 121 and facilitating communication between sites 103a, 103b, 103c and/or 103d. Network 121 may include a local area network (LAN), a metropolitan area network (MAN), a wide area network (WAN), any other public or private network, a local, regional, or global communication network, an enterprise intranet, other suitable wireline or wireless communication link, or any combination of the preceding. Network 121 may include any combination of gateways, routers, hubs, switches, access points, base stations, and any other hardware, software, or a combination of the preceding that may implement any suitable protocol or communication.

User 107 represents one or more individuals or groups of individuals who are present for the visual conference. Users 107 participate in the visual conference using any suitable device and/or component, such as an audio Internet Protocol (IP) phones, video phone appliances, personal computer (PC) based video phones, and streaming clients. During the visual conference, users 107 engage in the session as speakers or participate as non-speakers.

Telepresence equipment 109 facilitates the videoconferencing among users 107. Telepresence equipment 109 may include any suitable elements to establish and facilitate the visual conference. For example, telepresence equipment 109 may include loudspeakers, microphones, or a speakerphone. In the illustrated embodiment, telepresence equipment 109 includes cameras 111, display monitors 113, a processor 115, and a network interface 117.

Cameras 111 include any suitable hardware and/or software to facilitate both capturing an image of user 107 and her surrounding area as well as providing the image to other users 107. Cameras 111 capture and transmit the image of user 107 as a video signal (e.g., a high definition video signal). Display monitors 113 include any suitable hardware and/or software to facilitate receiving the video signal and displaying the image of user 107 to other users 107. For example, display monitors 113 may include a notebook PC, a wall mounted display, a floor mounted display, or a free standing display. Display monitors 113 display the image of user 107 using any suitable technology that provides a realistic image, such as high definition, compression hardware, and efficient encoding/decoding standards. Telepresence equipment 109 establishes the visual conference session using any suitable technology and/or protocol, such as Session Initiation Protocol (SIP) or H.323. Additionally, telepresence equipment 109 may support and be interoperable with other video systems supporting other standards, such as H.261, H.263, and/or H.264.

Processor 115 controls the operation and administration of telepresence equipment 109 by processing information and signals received from cameras 111 and interfaces 117. Processor 115 includes any suitable hardware, software, or both that operate to control and process signals. For example, processor 115 may be a programmable logic device, a microcontroller, a microprocessor, any suitable processing device, or any combination of the preceding. Interface 117 communicates information and signals to and receives information and signals from network 121. Interface 117 represents any port or connection, real or virtual, including any suitable hardware and/or software that allow telepresence equipment 109 to exchange information and signals with network 121, other telepresence equipment 109, or and/or other elements of system 100.

In an example embodiment of operation, users 107 at sites 103a and 103b desire to participate in a visual conference. One of users 107 at site 103a may speak. His voice may be detected locally and reproduced remotely such that users 107 at site 103b are able to quickly identify, by the location of the sound, which user 107 is speaking.

Modifications, additions, or omissions may be made to system 100. For example, system 100 may include any suitable number of sites 103 and may facilitate a visual conference between any suitable number of sites 103. As another example, sites 103 may include any suitable number of cameras 111 and display monitors 113 to facilitate a visual conference. As yet another example, the visual conference between sites 103 may be point-to-point conferences or multipoint conferences. Moreover, the operations of system 100 may be performed by more, fewer, or other components. Additionally, operations of system 100 may be performed using any suitable logic.

A Telepresence System Embodiment

FIG. 2A illustrates a perspective view of an example telepresence system 200 in a space 250 that includes an embodiment of the present invention. FIG. 2B illustrates a top view of the telepresence system 200 in the space 250. Telepresence system 200 may be used for any one of sites 103 of FIG. 1. Telepresence system 200 provides for a high-quality visual conferencing experience that surpasses typical video conference systems. Using some embodiments of telepresence system 200, users may experience lifelike, fully proportional (or nearly fully proportional) images in a high definition (HD) virtual table environment. The HD virtual table environment, created by telepresence system 200, may help to develop an in-person feel to a visual conference. The in-person feel may be developed not only by near life-sized proportional images, but also by the exceptional eye contact, gaze perspective (hereinafter, "eye gaze"), and location specific sound.

The eye gaze may be achieved through the positioning and aligning of the users, the cameras and the display monitors. Also helping achieve the eye gaze is the lighting as provided in one aspect of the present invention.

Some embodiments include location specific sound realized through the use of individual microphones located in particular areas that are each associated with one or more loudspeakers located in proximity to the display monitor displaying the area in which the microphone is located. This may allow discrete voice reproduction for each user or group of users.

One embodiment of telepresence system 200 includes a processor (not shown) to control the operation and administration of the components of the system by processing information and signals received from such components. One embodiment of the processor includes suitable hardware and software that operate to control and process signals. For example, the processor may be a programmable logic device, a microcontroller, a microprocessor, any suitable processing device, or any combination of the preceding. Through its operation, the processor may facilitate the accurate production of the eye-gaze functionality as well as the location specific sound.

Referring to both FIGS. 2A and 2B, telepresence system 200 includes display monitors 113, cameras 111 (shown enclosed), loudspeakers (not shown), and microphones, a table 217, walls, lighting, and several other components. The one or more participants 107 are shown as circles on chars in FIG. 2B. A longitudinal axis denoted z-z is shown, as is a transverse axis denoted x-x perpendicular to the longitudinal axis, and a vertical axis shown denoted y that is perpendicular to both the transverse and longitudinal axes. The longitudinal axis is also called the depth axis, and the x-x direction defines width. The space 250 has a floor defined to be at y=0 and extending transversely and longitudinally on which the physical components of telepresence system 200 sit. Referring to FIG. 2B, the vertical planar section A-A is defined to be at z=0, i.e., to correspond to the x-y plane, and the vertical planar section denoted BB is defined to be at x=0, i.e., to correspond to the y-z plane. The space 250 also has a front, a rear, and sides. In some versions, the space 250 is a room having walls, including a rear wall 225. By convention, referring to FIG. 2B, front to rear is along the longitudinal (z-) axis. The one or more participants sit towards the front of the space 250 facing rearward, and the display monitors are, by definition, near z=0, and displaying respective images towards the front.

Still referring to FIG. 2A, for a direction denoted by a vector, azimuth is defined conventionally to be the angle between the z-axis and the projection onto the x-z plane of the vector v, while inclination (also called elevation) is defined to be the angle between the vector v and the projection onto the x-z plane of the vector v.

Some components and devices may be designed to help mask the technology involved in telepresence system 200, thus decreasing the sense of being involved in a video conference while increasing the sense of communicating in person.

Part of the in-person experience may be achieved by the fact that the telepresence system may include many of the features and/or components of a room. In some embodiments the rooms at both ends of the conference may be similar, if not identical, in appearance because of the use of telepresence system 200. Thus, when local users 107 look into display monitors 113 they are presented with an image having, in the background, a room that appears to match their own room. For example, the walls of the space 250 of telepresence system 200 may have similar colors, patterns, and/or structural accents or features as remote walls of the space of the remote telepresence system.

The eye gaze and the location specific sound features may combine to produce a very natural dialogue between local and remote users. When, for example, a remote user speaks, her voice is reproduced through a loudspeaker located proximate to the display monitor on which remote user is displayed. Local users may naturally turn their attention towards the sound and thus may be able to quickly focus their attention on this remote user. Furthermore, if a remote user is looking at something or someone, the exceptional eye gaze capabilities of some embodiments of telepresence system 200 may allow local users 107 to easily identify where that remote user is looking. This natural flow may help to place the users at ease and may contribute to the in-person feel of a telepresence assisted visual conferencing experience.

Another aspect of telepresence system 200 that lends itself to creating an in-person experience is the configuration of the table 217, the display monitors 113 and cameras 111. These components are positioned in concert with one another such that it appears that table 217 continues through display monitor 113 and into a table of the remote system shown in the monitor, forming a single continuous table, instead of two separate tables at two separate locations.

One feature of embodiments of the present invention is the use of lighting that is designed and calibrated in concert with remote cameras 111 and display monitors 113 to enhance the image displayed by display monitors 113 so that the colors of the image of remote users displayed on display monitors 113 more closely approximate the actual colors of remote users. The lighting may be such that its color temperature helps to compensate for any discrepancies that may be inherent in the color captured by remote cameras and/or reproduced by display monitors 113.

For example, in some embodiments the lighting is controlled to be between 4000 Kelvin and 5100 Kelvin. In particular, in some embodiments, the lighting is controlled to be between 4000 Kelvin and 4100 Kelvin One embodiment uses lighting controlled to have color temperature of 4100 Kelvin.

Particular embodiments may not only control the color temperature of the lights, but may also dictate the placement. A Lighting Subsystem Including a Planar Panel Having a Reflective Front Surface One aspect of embodiments of the present invention is a lighting subsystem operative such that lighting is directed frontwards towards the participants 107 from height or heights above the heads of the participants 107. Such lighting is placed above the heads of remote users and helps reduce shadows located thereon. This may be particularly important where remote cameras 111 are at a higher elevation than the tops of remote users 107's heads.

One feature of embodiments of the lighting subsystem is that such lighting is placed behind remote cameras 111 so that the front of the users 322 is properly illuminated. Particular embodiments include a light source 215 comprising light source segments, each light source segment being behind, and lower than the top edge of each of the display monitors 113. In one embodiment, each light source segment 215 is an LED light bar. Thus, each segment of the light source 215 is at a light source position, including a light source height from the floor. The light source is operative to direct light rearward in a plurality of directions. Considering a section in the z-y plane, and a light source section, the light source segment can be considered a point source. The light source comprises can be approximated as a point source in a vertical-longitudinal cross-section.

In the embodiment shown in FIGS. 2A and 2B, there are three monitors. The left and right monitors each have a light bar of a first length, e.g., 48", placed behind the monitor and directing light in all directions towards the rear, and the center display monitor has a pair of light bars each of a second length less than the first length, e.g., each having 23" length placed behind the monitor and directing light in all directions towards the rear. As shown in FIGS. 2A to 2B, telepresence system 200 includes a planar panel 211 having a height in the vertical (y-) direction, a width in the transverse (x-) direction, and a thickness in the longitudinal (z-) direction. The planar panel 211 has a rear surface 223, and a reflective front surface 221. In one embodiment, the planar panel 211 is placed in the space 250 parallel to the transverse horizontal (x-) axis at a pre-defined distance rearward in the z-direction from the light source 215.

Figure 2E:
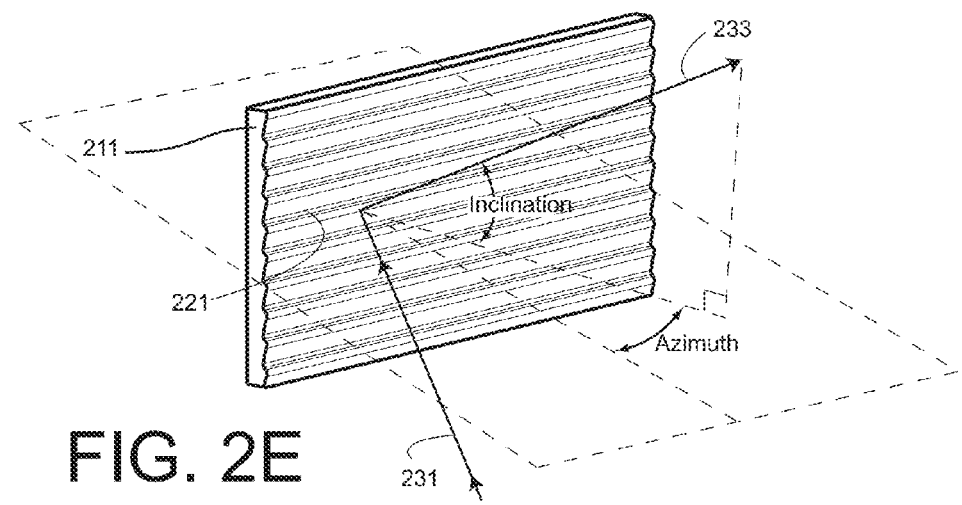
FIG. 2E shows a light ray from the light source incident to and reflected from a point on the reflective front surface, and shows how the direction of the reflected light ray can be defined by an azimuth and an inclination (also called elevation)
Figure 2B:
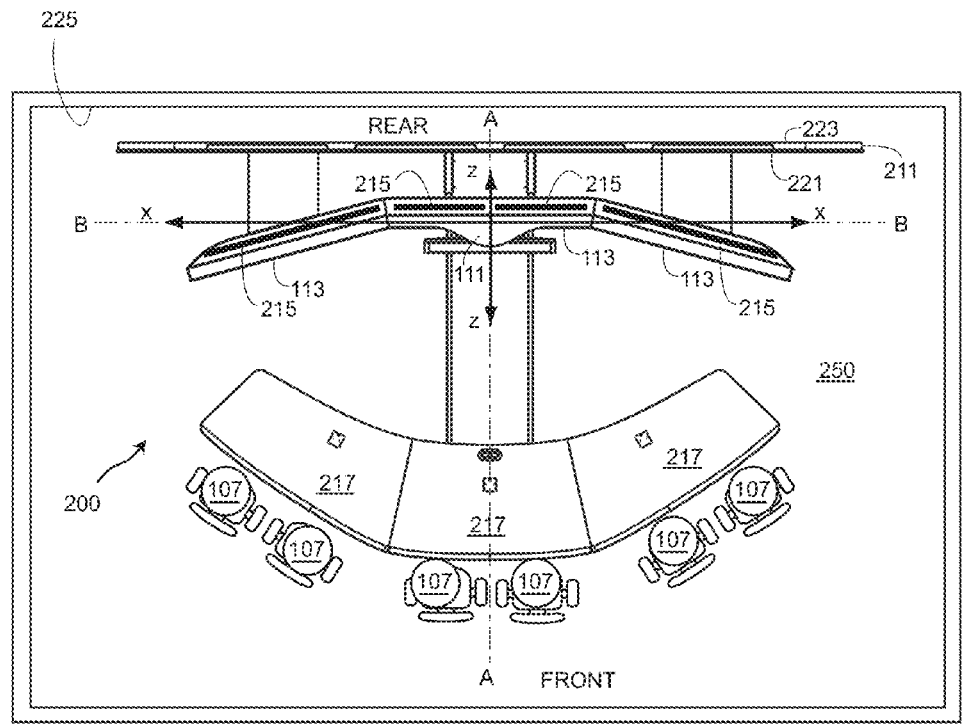
FIG. 2B illustrates a top view of the telepresence system in the space shown in FIG. 2A.
Figure 2C:
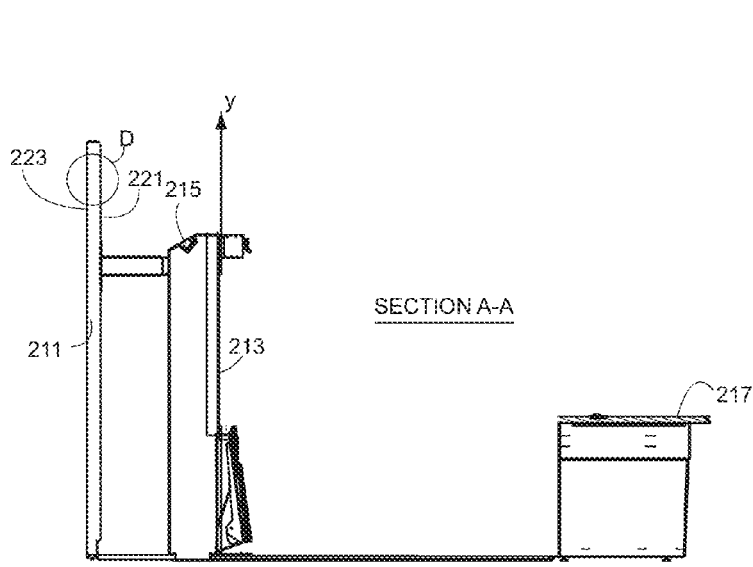
FIG. 2C shows the section marked A-A as viewed from left to right in FIG. 2B.
Figure 2D:
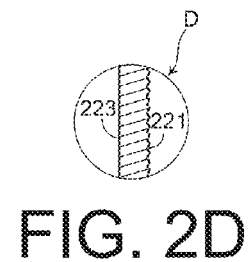
FIG. 2D shows the area labeled D in FIG. 2C in more detail.

FIG. 2C shows the section marked A-A as viewed from left to right in FIG. 2B, that is, the x-y plane, and some of the elements of the telepresence system 200 therein, in particular, table 217, display monitor 113, light source segment 215, and panel 211, including the front (reflective) surface 221 and the rear surface 223. For simplicity, internal details of these elements are not shown in FIG. 2C. FIG. 2D shows the area labeled D in FIG. 2C in more detail.

The light source 215 directs light towards the reflective front surface 221 of planar panel 211. The light is reflected off the reflective front surface 221. One feature is that the reflective front surface 221 of the planar panel 211 includes indentations that are shaped in depth to direct light rays from the light source 215 frontwards towards the one or more participants 107 of a teleconference when the participants 107 are sitting in front of the panel 211 viewing the one or more display monitors 113 that are located between the planar panel and the participants 107 and operative to display respective images to the one or more participants 107.

FIG. 2E shows a light ray 231 from the light source 215 incident to and reflected from a point on the reflective front surface 221. Note that only a section of the front surface 221 of the planar panel 211 is shown. The direction of the reflected light ray 233 has a direction that can be defined by the azimuth and the inclination (also called elevation). One aspect of the invention is that at least some of the indentations are shaped in depth to direct light rays from the light source, the directing in at least inclination towards the one or more participants 107 of a teleconference when the participants 107 are sitting viewing the one or more display monitors 113. In one embodiment, the indentations comprise channels, e.g., channels running transversely that are shaped in depth to direct, in inclination, light reflected from the light source 215 frontwards towards the one or more participants 107.

In one embodiment, the indentations comprise channels, e.g., channels running transversely that are shaped in depth to direct in inclination light reflected from the light source 215 frontwards towards the one or more participants 107. The channels have a width in the vertical direction, and a variable depth in the longitudinal direction, the depth varying with height, the variation of the respective variable depths of the channels calculated to direct in inclination the reflected light from the light source towards the one or more participants.

While the remainder of the description is for the front surface 221 to include indentations that are horizontal channels parallel to the x-x axis, the channels having a fixed width, and a shape calculated to direct in inclination the reflected light from the light source towards the one or more participants, in alternate embodiments, the surface 221 comprises indentations that are not vertically stacked horizontal channels. The front surface 221 in one such alternate embodiment comprises rectangular or square indentations distributed in some pattern, or even randomly along the surface 221. One such arrangement is a checkerboard pattern. In alternate embodiments, at some of the indentations may be round or elliptical, arranged in some pattern, or even arranged randomly along the surface. Furthermore, while in some embodiments, the height of the indentations, e.g., channels is constant, this is not a limitation; other embodiments include indentations, e.g., channels whose height is not the same. Many more variations are possible, as would be clear to one skilled in the art.

Furthermore, while one embodiment described herein has vertically stacked horizontal channels, another embodiment also includes some indentations that include a variable depth in the transverse direction that are designed to direct light rays from the light source 215 in azimuth towards the participants. In one such embodiment, the panel 211 includes five panels: two other panels, two inner panels, and a central panel. The outer panels include indentations that vary in depth in the vertical direction, shaped to direct light rays from the light source 215 in inclination towards the participants 107, and that vary in depth in the transverse direction, shaped to direct light rays from the light source 215 in inclination towards the participants 107.

How to so shape the indentations in depth as a function of the transverse direction would be clear to one skilled in the art from the description herein of how to shape the indentations in depth as a function of the vertical direction.

FIG. 2D shows in magnified form the portion marked D in FIG. 2C of a cross-section in the vertical-longitudinal (y-z) plane of the panel 211. As can be seen, the front surface has channels whose depth in the z-direction varies with height y. The channels in cross section form segments of the front surface 221.

In some embodiments, the planar panel 211 is made up of planar sections, called subpanels herein. In one embodiment, there are five subpanels: a right subpanel, a left subpanel, an inner right subpanel, an inner left subpanel, and a center subpanel. See FIGS. 7A through 7D, and the description thereof herein below.

Figure 3A:
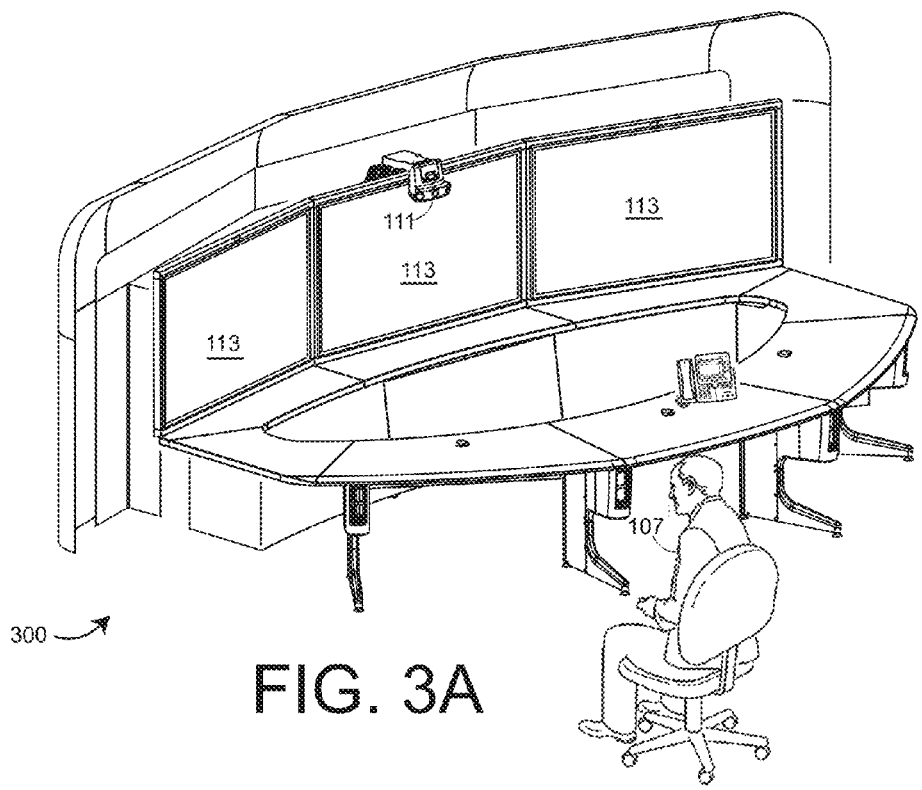
FIG. 3A shows a perspective view of a telepresence system that includes some components that are similar to components of FIGS. 2A-2C.
Figure 3B:
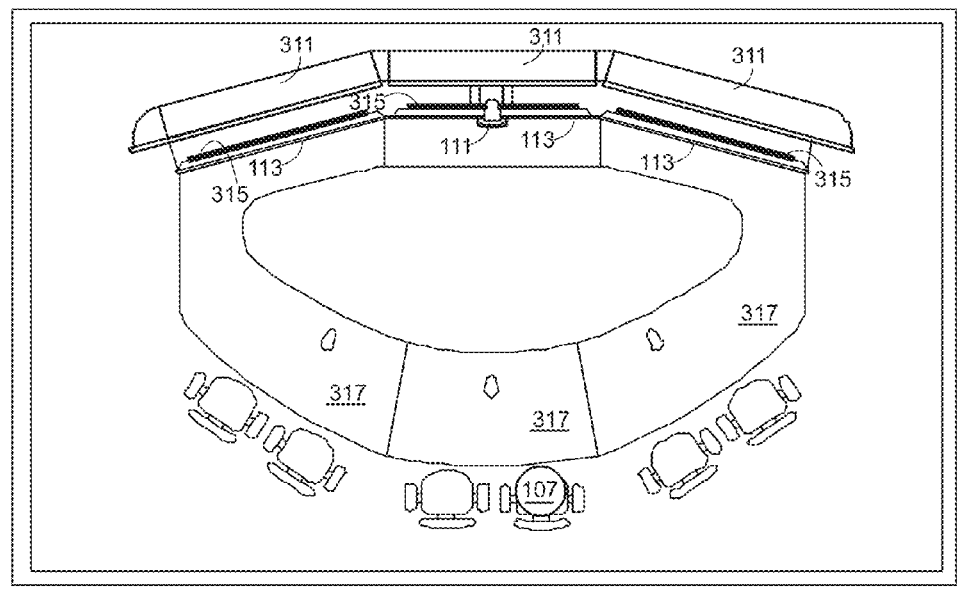
FIG. 3B shows a top view of the another telepresence system of FIG. 3A.

FIG. 3A shows a perspective view and FIG. 3B shows a top view of a telepresence system 300 that includes some components that are similar to components of FIGS. 2A-2C, but that does not include some of the features of the present invention, and in particular does not include the planar panel 211 that is used as a reflector in combination with light source 215 to form illumination for the participants.

As shown in FIGS. 3A and 3B, telepresence system 300 includes a table structure 317 next to which one or more participants 107 may be seated, remote cameras 111, and display monitors 113. A light source 315 comprises sections, each section mounted behind, and lower than the top edge of each of the display monitors 113. A lighting system comprises the light source 315 and reflector structure 311 positioned behind display monitors 113 and light source 315 and in some embodiments, extends out beyond the outside perimeter of display monitors 113. The reflector structure 311 includes a front surface that reflects light from the light source 315 towards the one or more participants 107. At least the portions of the front surfaces of reflector structure 311 that extend beyond display monitors 113 are curved, and are designed so that the light from lights 215 is reflected off of reflector's front surface and towards users 324.

In the system shown in FIGS. 3A and 3B, at least each of the portions of reflector structure 311 that extend beyond display monitors 113 has a curve or arch to it, or is otherwise angled so that the light is reflected off of the front surfaces of reflector structure 311 and towards the participants. This results in the bulky, shroud like structure shown in the drawings.

In contrast, the planar panel 211 that has a reflective front surface 221 is thin and not intrusive compared to the shaped reflector structure 311 of telepresence system 300.

The Planar Panel with the Reflective Surface

In one embodiment, the light source is at a predefined height, and comprised of three strip lighting elements, each element made up of an array of LEDs.

The reflective front surface 221 includes channels operative to direct light from the light at one or more angles towards the participants.

The channels repeat every 20 mm. In another embodiment, the channels repeat every 25 mm. While in one embodiment, the channels vary across the height of the panel 211, in another embodiment, the shapes of the channels are the same up to a pre-defined height, in one embodiment, 140 cm. Above the pre-defined height, the respective shape of each channel, in cross-section, changes with height so that the light from the light source 215 is directed towards the participants.

In a first embodiment, the variable depth channels that differ from channel to channel, e.g., the channels above the pre-defined height are operative to cause the light from the light source 215 to be reflected as parallel rays at a pre-defined angle to the horizontal, i.e., a predefined inclination towards the participants. In one embodiment, the pre-defined inclination is 0° so that the reflected rays are horizontal, and in another embodiment, at least some of the variable depth channels that differ from channel to channel are higher than the expected respective heights of respective faces of the one or more participants 107, and the pre-defined inclination is 10° downward. Other inclinations are of course possible within the scope of the invention.

In another embodiment, the variable depth channels that differ from channel to channel, e.g., the channels above the pre-defined height are operative to cause the reflected light beams to be directed towards a horizontal line extending parallel to the transverse (x-x) axis directly above the frontmost edge of the table 217 at a height of 140 cm from the floor. This is regarded as a typical position for the head of a typical participant, e.g., as determined from statistical data. In a longitudinal-vertical cross section, the respective shapes of the channels are operative to reflect light from the light source 215 (a point in the cross-section) towards a point 140 cm high and directly above the front edge of table 217. Of course, other positions are possible in alternate embodiments.

Figure 4:
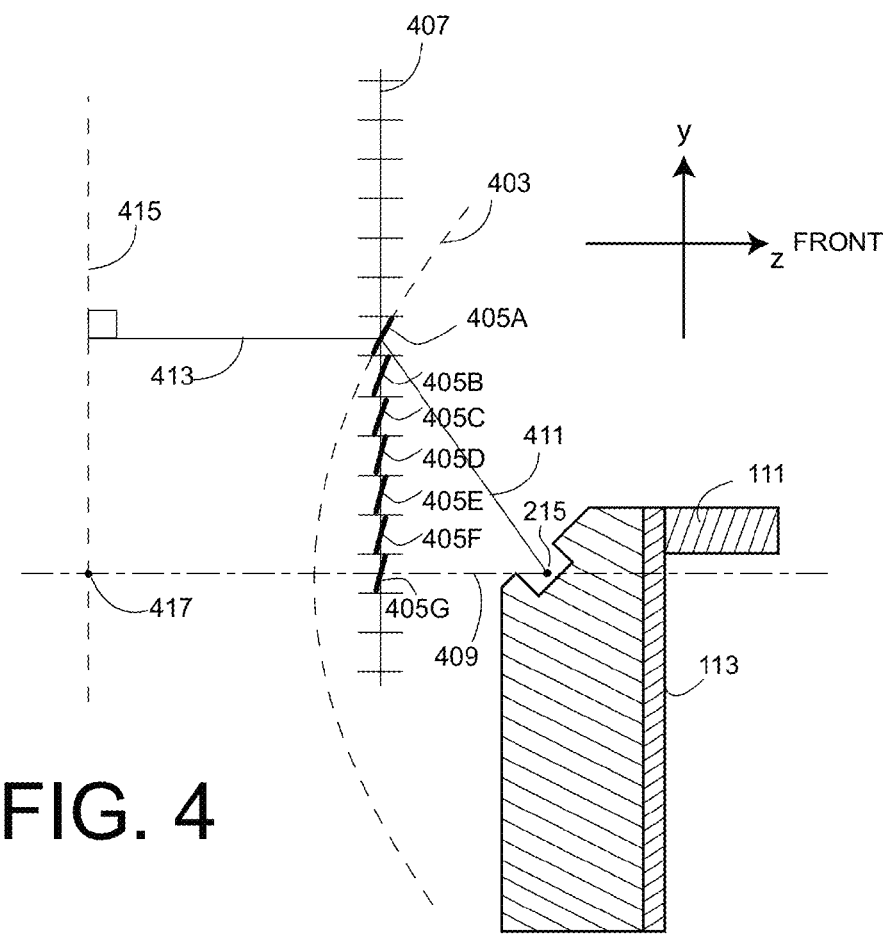
FIG. 4 shows a cross section in the vertical-longitudinal (y-z) plane of some elements of a telepresence system to illustrate how the shapes of channels of the reflective front surface of a planar panel may be calculated in accordance with an embodiment of the invention.

Consider first the embodiments according to which the light is reflected as parallel rays having a pre-defined inclination. FIG. 4 shows a cross section in the vertical-longitudinal (y-z) plane of some elements of telepresence system 200 to illustrate how the shapes of the channels of the reflective front surface 221 of planar panel 211 may be calculated in accordance with one such embodiment of the invention, in this case to direct the reflected rays to have inclination of 0°. The drawing is not to scale, with the proportions and sizes exaggerated for ease of explanation. The channels on the surface 221, for example, are shown much larger than the channels in an actual implementation. In one embodiment, the cross-section of the light source 215 in the vertical-longitudinal (y-z) plane can be considered a point source, shown as point 215 in FIG. 4. Also shown are display monitor 113 and remote camera(s) 111. Light beams from the light source 215 emanate backwards towards the reflective front surface 221. In FIG. 4, 409 represents an axis in the z-direction on which the light source 215 is situated, and the axis 407 is the axis of the midpoints of the shaped channels of the reflective front surface 221. In cross section, the channels of the reflective front surface 221 can be considered segments that are shaped in the vertical-longitudinal plane such that light from the light source is reflected with an inclination of 0° towards the participants. Several such segments 405A, 405B, 405C, 405D, 405E, 405F, and 405G, are shown in the drawing. Axis 407 is the axis of the midpoints of the shaped segments of the reflective front surface 221. In one embodiment, some of the segments, e.g., 405A, 405B, 405C, and 405D are different and designed such that light rays from the light source 215 that are reflected off the segments are parallel at 0° inclination in the frontward direction towards the participants 107 (not shown). For esthetic reasons, in one embodiment, other segments, e.g., 405D, 405E, 405F, and 405G do not differ from each other. That is, some channels in the front surface 221 do not differ from each other. In one particular embodiments, the channels up to a height of about 140 mm are identical, while those channels above the predefined height of 55" vary.

It is known that a light source placed at the focus of a parabolic reflector causes the light rays reflected to be parallel. Hence, in one embodiment, each of the segments of the portion of the reflective front surface 221 that is used as lighting for the participants is a segment of a parabola having the light source at its focus and a axis of symmetry at the desired inclination of the reflected rays, in this case at inclination of 0°, shown as axis 409. Consider, for example, segment 405A. The location of the focus 215 and the segment defines a parabola shown as parabola 403 of which 405A is a segment. The length of the line 411 defines a line 413 of inclination 0°, i.e., parallel to the axis of symmetry 409 and having the same length as line 411. Line 413 in turn defines the directrix 415 of the parabola 403 to be perpendicular to line 413 at line 413's end. Point 417 is the intersection of the axis of symmetry 409 and the directrix 415. The midpoint 409 between the intersection 417 at directrix 415 and the focus 215 defines the vertex of the parabola 403.

In this manner, the shape of each of the segments may be determined, and hence so may the shape of the channels of the reflective front surface 221 be determined. Each such segment is on the surface 221, and is a segment of a parabola having the light source as its focus, and having a selected axis of symmetry, e.g., an axis of symmetry co-planar with the x-z axis, i.e., having zero inclination.

Note that while FIG. 4 shows an axis of symmetry of 0° inclination, in alternate embodiments, the axis of symmetry is at a light angle, e.g., 10 degrees inclination downwards.

Note that the stacked up segments 405A-405G are thin compared with the parabola 403.

Figures 5A, 5B:
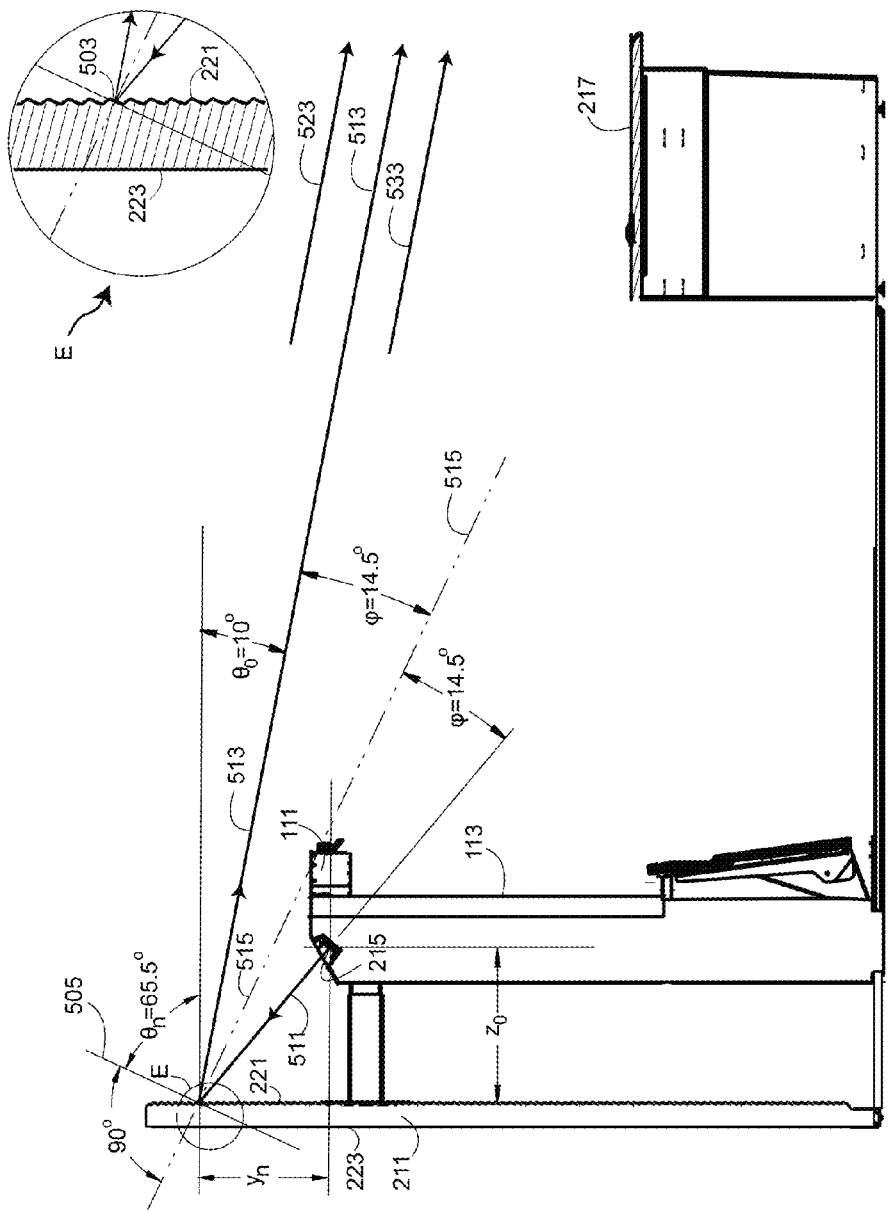
FIG. 5A shows a vertical-longitudinal cross-section of an embodiment of telepresence system 200 that includes such a panel having a reflective front surface in accordance with an embodiment of the present invention.
FIG. 5B shows, in enlarged form, the region denoted E in FIG. 5A.

In a different embodiment, the channels, rather than having reflective surfaces that are parabolic in vertical-longitudinal cross-section, have reflective surfaces that include straight line segments approximating the parabolic segments in the vertical-longitudinal cross-section. FIG. 5A shows a vertical-longitudinal cross-section of an embodiment of telepresence system 200 that includes such a panel 211. FIG. 5B shows, in enlarged form, the region of FIG. 5A denoted E. Denote by $z_0$ the horizontal distance from the horizontal position of the light source 215 and the reflective front surface 221 of the panel 211. Consider a channel, say the n'th channel, that is at a height denoted $y_n$ from the height of the light source 215. A ray of light 511 travelling to the n'th channel is at angle $\arctan(y_n/z_0)$ to the horizontal. Suppose the channels are designed to reflect rays from the light source 215 back towards the participants at an angle denoted $\theta_0$ to the horizontal. The ray from the n'th channel is shown as ray 513. Other rays 523 and 533 parallel to ray 513 but from other channels also are shown. In one embodiment, e.g., that of the parabolic shapes illustrated in FIG. 4, $\theta_0=0°$. In the embodiment shown in FIGS. 5A and 5B, $\theta_0=10°$.

The angle denoted $\theta_n$ to the horizontal for the straight line segment 503 of the n'th channel that causes the reflected ray 513 to be at $\theta_0=10°$ is easily determined to be $$\theta_n = 90° - \tfrac{1}{2}\theta_0 + \tfrac{1}{2}\arctan(y_n/z_0).$$

As shown in FIGS. 5A and 5B, the line 505 is collinear with the straight line segment 503 of the n'th channel, and the line 515 is perpendicular to line 505. Denote by $\phi$ the angle of incidence of the ray 511 to line 515. The reflected ray 513 is then also at angle $\phi$. For the $\theta_0=10°$ situation shown in FIGS. 5A and 5B, $\phi=14.5°$ and the angle $\theta_n$ is 45.5°.

In this manner, the angle of each segment of the reflective front surface 221 can be calculated.

For esthetic reasons, in one version, some channels in the front surface 221 do not differ from each other. In one particular embodiments, the channels up to a pre-defined height, e.g., a height of about 55" are identical, while those channels above the pre-defined height vary.

Consider now the embodiment in which the variable depth channels that differ from channel to channel are operative to cause the light from the light source to be directed towards a horizontal line extending parallel to the transverse axis. The horizontal line is at a longitudinal direction where the head of a typical participant is likely to be located, and at a height at which the head of the typical participant is likely to be when sitting at the table 217. The size of a "typical participant" can be determined from statistical data, e.g., as the average proportion, or carried out by experiment. For certain markets, where participants are likely to be shorter or taller than in another market, the location of the horizontal line can be adjusted. In one embodiment, the horizontal line is immediately above the front edge of the front-most table 217. This is the center table that has the front-most edge parallel to the transverse (x-x) axis. The height of the horizontal line in one embodiment is 140 cm.

Figure 6:
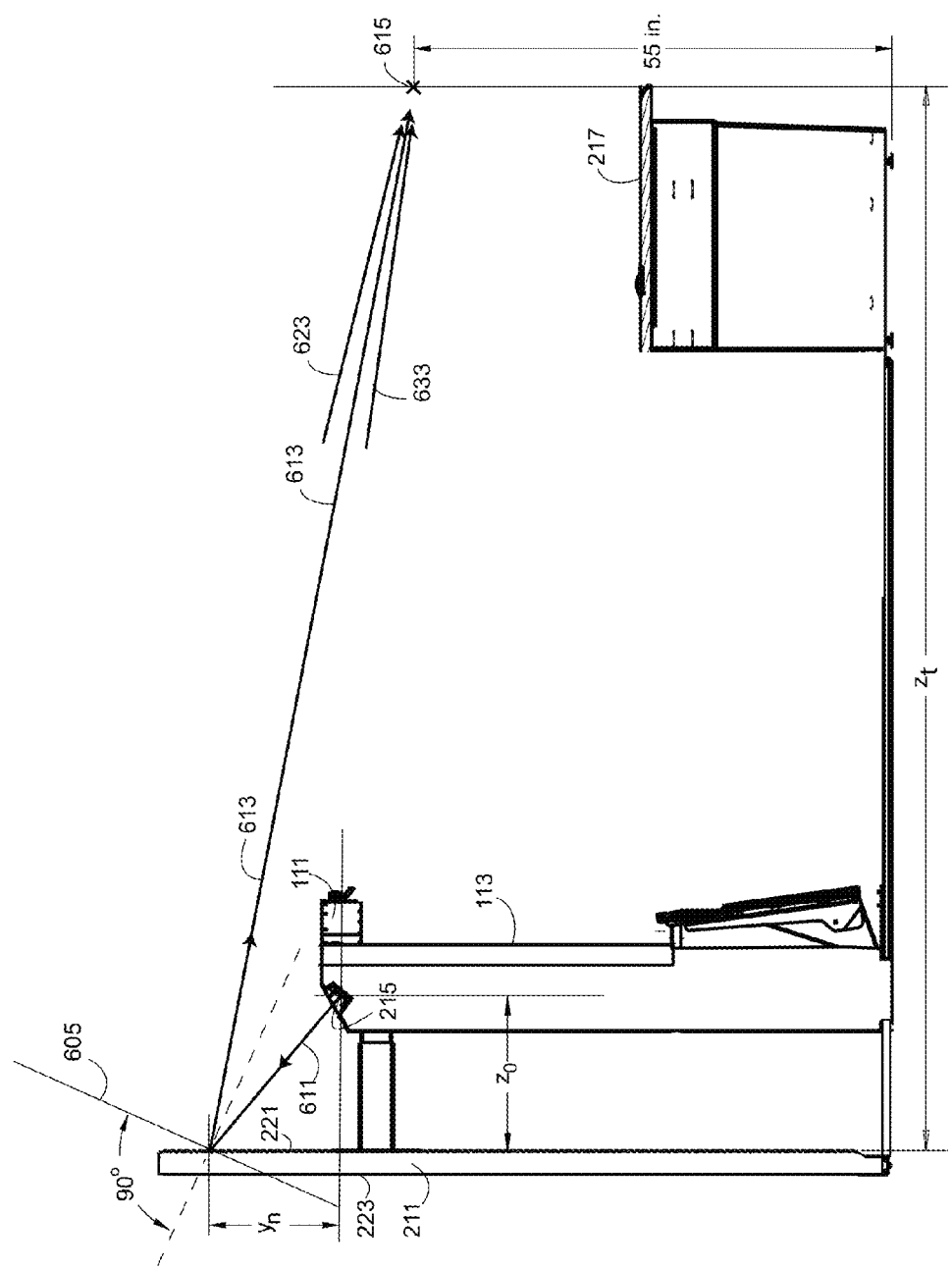
FIG. 6 shows a vertical-longitudinal cross-section of a telepresence system that includes a panel designed such that the reflected light rays are directed towards a line at the front-most edge of the front table at a pre-defined height from the floor in accordance with an embodiment of the present invention.

FIG. 6 shows a vertical-longitudinal cross-section of an embodiment of telepresence system 200 that includes a panel 211 designed such that the reflected light rays are directed towards such a line directly above the front-most edge of the table 217 at a pre-defined height from the floor, the height being 140 cm in one version. The respective shapes of the channels, in cross section, are operative to reflect light towards a point 615, marked x in FIG. 6. In one version, the shape of each channel in longitudinal-vertical cross-section is of a segment of an ellipse that has a first focus at the point of the light source 215 in cross-section and the second focus at point 615. It is known that light rays ray emanating towards the rear from the rearmost focus of an ellipse with a reflective inner surface are reflected to meet at the second (front-most) focus of the ellipse.

In one version, for each channel, the segment of the ellipse is approximated by a straight line segment. Defining $z_0$ and the horizontal distance from light source 215 to the reflective front surface 221, and defining $z_t$ as the horizontal distance from the reflective front surface 221 to the front-most edge of table 217, and assuming each channel has a straight line segment, those in the art will readily be able to determine the angle for each such straight line portion. For example, considering the n'th segment at height denoted $y_n$ from the height of the light source 215, the light ray from the source is shown as ray 611, and is reflected to form ray 613 towards point 615. There is sufficient data in FIG. 6 to readily determine the angle of line 605 which is collinear with the n'th segment and that causes the reflected ray 613 to be directed towards 615. Similarly, the angles for other segments can readily be determined. Two other rays 623 and 633 reflected from other channels on the reflective front surface 221 are shown in FIG. 6.

In practice, the variation in depth of the channels need not extend the whole height of the channels, and this might cause sharp ridges at the meeting points of channels that are vertically adjacent, which might be considered esthetically undesirable. Rather embodiments of the present invention include ridges at the meeting points of the channels that are rounded to provide a smoother more esthetically pleasing surface 221 and appearance thereof.

Figure 7A:
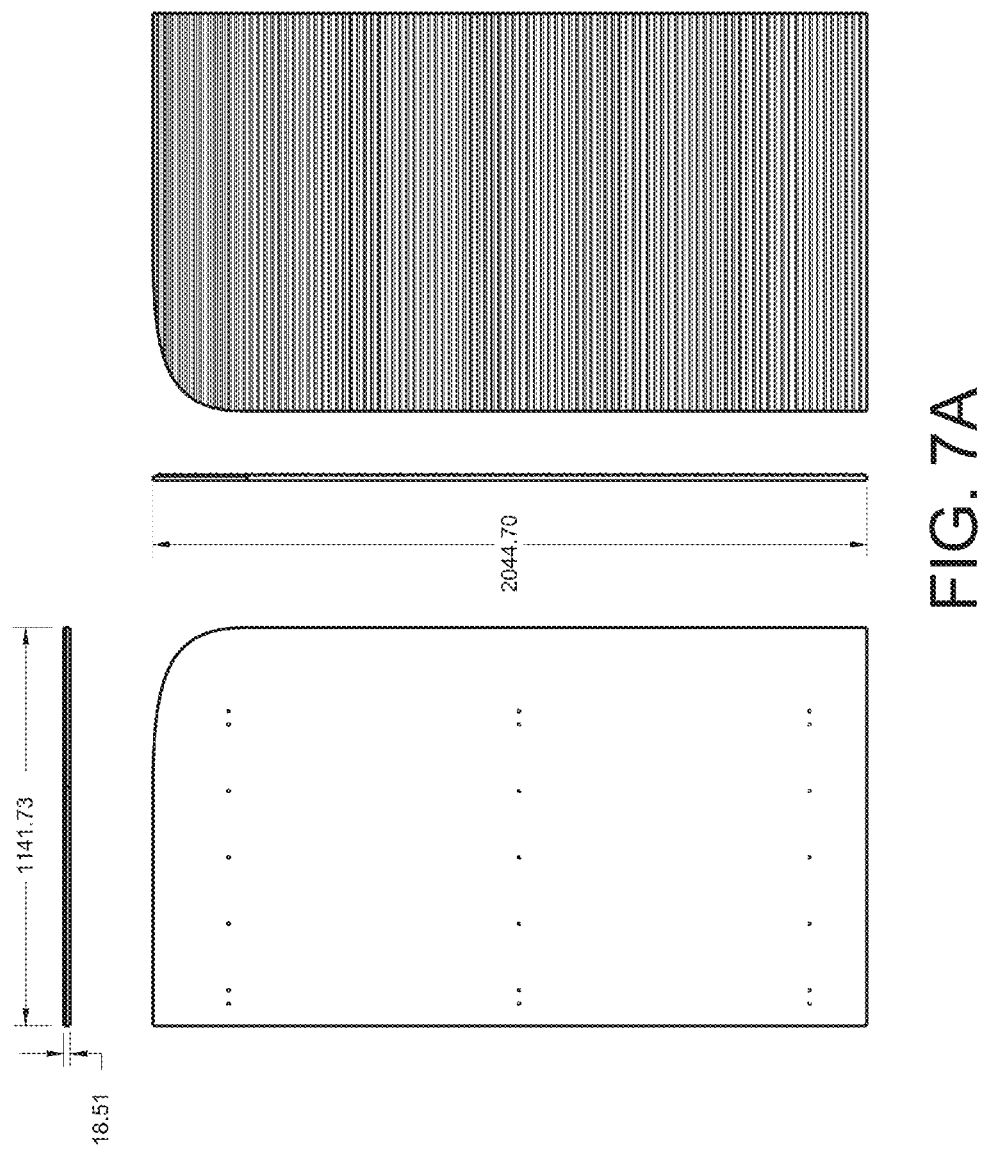
FIG. 7A shows projective views of an embodiment of a left subpanel of a panel with a reflective front surface in accordance with an embodiment of the present invention.
Figure 7C:
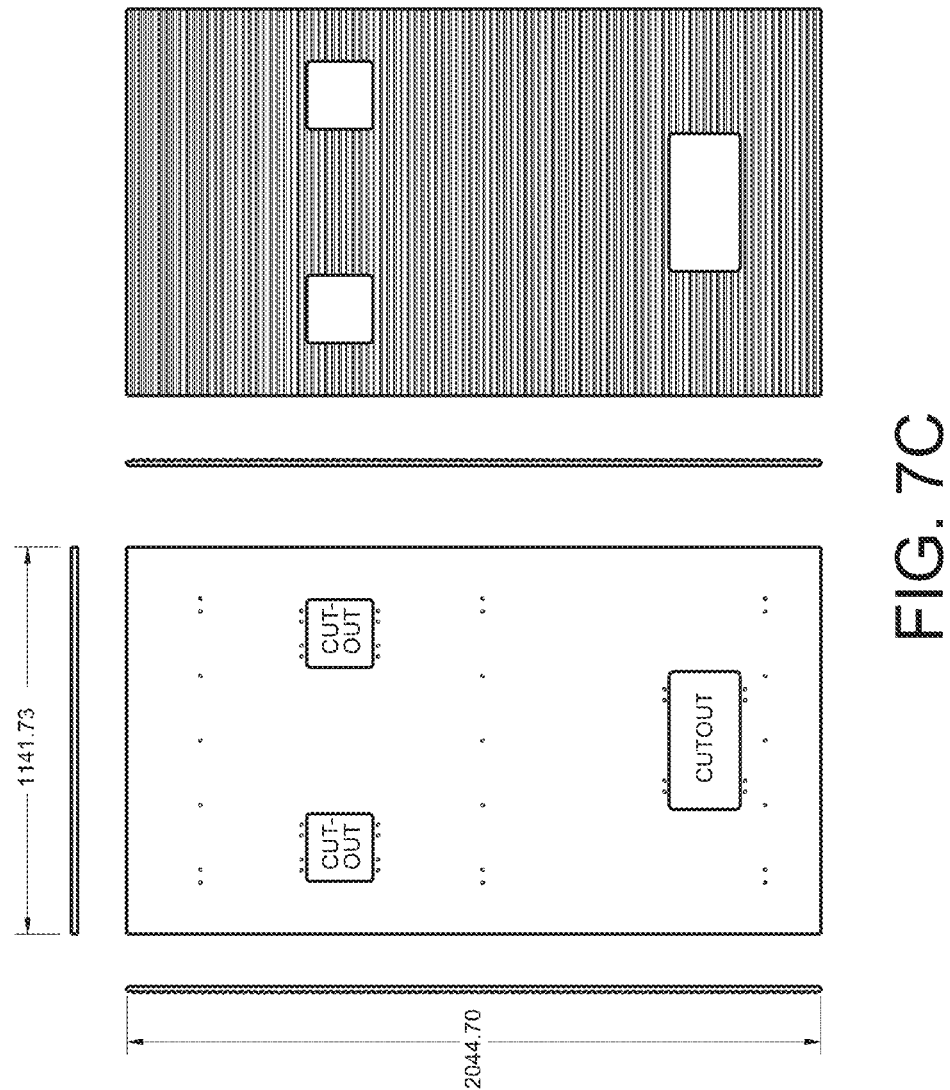
FIG. 7C shows projective views of an embodiment of the center subpanel of a panel with a reflective front surface in accordance with an embodiment of the present invention.
Figure 7D:
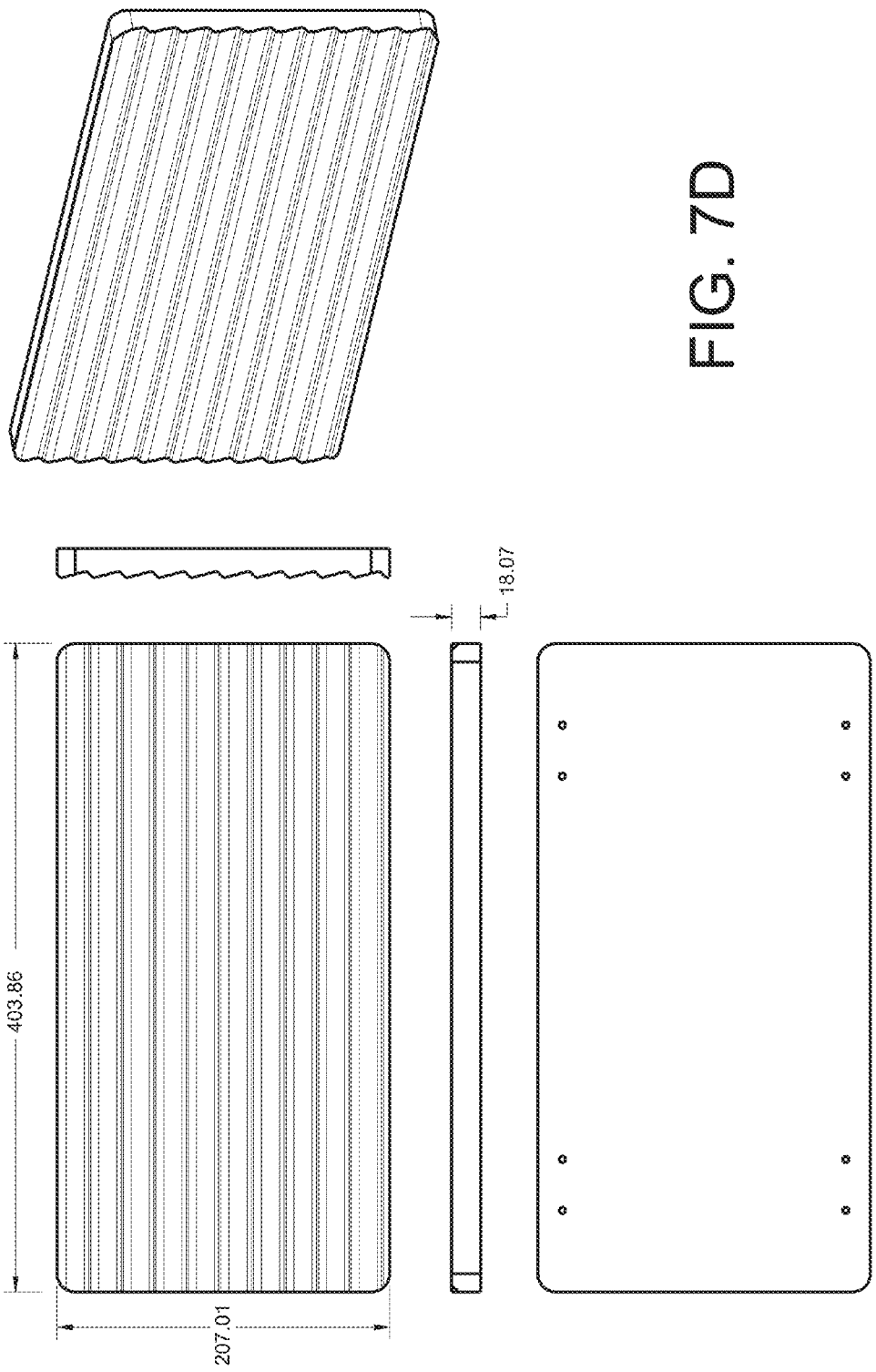
FIG. 7D shows projective views and a perspective view of a cover for the lowest cutout of the center subpanel shown in FIG. 7C.

In one embodiment, there are five subpanels: a right subpanel, a left subpanel, an inner right subpanel, an inner left subpanel, and a center subpanel. FIG. 7A shows projective views of an embodiment of the left subpanel. The left subpanel is a mirror image of the right subpanel. FIG. 7B shows projective views of an embodiment of the inner right subpanel. The inner left subpanel is a mirror image of the inner right subpanel. Note that the inner subpanels each have a cutout. There is a matching element that covers the cutout to fill in the hole, and that also includes a reflective front surface with channels that match the channels that would be on the reflective front surface of the inner subpanel were the cutout not there. FIG. 7C shows projective views of an embodiment of the center subpanel. Note that the center subpanel includes three cutouts. There is a respective matching element that covers each respective cutout to fill in the respective hole, and that also includes a respective reflective front surface with channels thereon that match the channels that would be on the respective corresponding area of the respective reflective front surface of the center subpanel were the respective cutout not there. FIG. 7D shows projective views and a perspective view of a cover for the lowest cutout of the center subpanel shown in FIG. 7C.

In one embodiment, the five subpanels are made of high density fiberboard, with the grooves having the desired shapes machined (routed by blades) into the front surface using a computer numerical control machine, and the surfaces laminated by a vacuum forming process using plastic material of a neutral white color designed to reflect light at a color temperature of 4000 K to 5100 K without changing the color temperature. FIGS. 7A-7D show dimensions of one embodiment of the subpanels in mm. These dimensions do not include the lamination. In one embodiment, using these dimensions, the planar panel 211 that is made up of the five subpanels shown in FIGS. 7A-7C is approximately (to the nearest cm) 205 cm high by 571 cm wide by 2 cm thick.

One version of the subpanels is made by Soelberg Industries of Orem, Utah, USA.

In one embodiment, the light source 215 comprises one or more LED light bars. In the embodiments shown in FIGS. 2A-2C, the light source 215 is made up of four LED light bars: two LED light bars each of length 23" behind the center display monitor and one LED light bar of length 48" behind each of the left and right display monitors.

Furthermore, because the left and right display monitors are not parallel to the transverse (x-x) axis, the light from a point that is further from the center display monitor along the light bar travels a greater distance than from a point that is closer to the center display monitor along the light bar. To compensate, each of the light bars behind the left and right display monitors includes two zones that output different light levels: an inner zone that is placed closest to the center display monitor and an outer zone that is placed further than the inner zone from the center display monitor. The light output from the outer zone is twice the light output from the inner zone.

In one embodiment, the LED light bars operate at 12V, and output light at a color temperature of 4100 K at 12V input voltage measured at a distance of 8 ft. In one embodiment, the 23" light bars output 140 lux with 12V input voltage measured at a distance of 8 ft., and the 48" light bars output 230 lux with 12V input voltage measured at a distance of 8 ft. Two suppliers of such light bars are Harvatek Corporation of Hsinchu City, Taiwan, and QT-BRIGHTEK Corporation, with a sales office in Milpitas, Calif.

The lighting is designed to provide at least 100 lux to each seated position in the arrangement shown in FIGS. 2A-2C. In one embodiment, the light output after reflection by the reflective front surface 221 of planar panel 211 is 125 lux to each of the participants in the arrangement shown in FIGS. 2A-2C.

In one embodiment of the telepresence system, the system is in a room, and the planar panel 211 is mounted on a wall of the room. The distance from the reflective front surface 221 and the light source 215 is arranged so that the reflected light rays are correctly directed towards the participants 107.

Another embodiment of the telepresence system includes mounting hardware to mounts the planar panel 211 so that the reflective front surface 221 is at a pre-defined distance from the light source 215 so that the reflected light rays are correctly directed towards the participants 107.

In particular embodiments, filters may be used to filter the light being generated from behind monitors. Note that when in use, the reflected light is not the only source of light for the participants. Additional lighting is provided, e.g., and reflected by the walls of the room. In one embodiment, the totality of the lighting, e.g., walls, lamps, the light source 215, the planar panel 211, and any filters used may be such that remote users are washed in a sufficient amount of light, e.g., between 300-500 lux, while reducing the level of intrusiveness of the light, e.g., avoiding having spots of light that may cause a participant to squint. Furthermore, some embodiments may include a low gloss surface on table 217. The low gloss surface may reduce the amount of glare and reflected light caused by table 217.

While one embodiment of the panel 211 is made of subpanels, each laminated high density fiberboard, another alternate embodiment of panel 211 is made of subpanels that are each made by a resin transfer molding process using a molding material, e.g., a thermoset plastic. Yet another alternate embodiment of panel 211 is made of subpanels that are each a composite subpanel panel made of a hardened structural skin that defines an outer surface, including the reflective surface 221 and a backing member fabricated from plaster material, a lightweight aggregate, and embedded with fibers. The hardened structural shell can be made of a material such as a gypsum based or fiber reinforced gypsum based material. Painting may be used to provide the required reflective properties. The invention is not limited by the technology used to make the panel 211 or the material the panel is made off.

While one embodiment of the light source 215 is made up of LED light bars, in alternate embodiments, other forms of lighting is used, e.g., light bars made up of fluorescent lights that provide lighting at the desired intensity and color temperature, or light bars made up of incandescent lights that provide lighting at the desired intensity and color temperature. The invention is not limited by the technology used to provide lighting.

It will be recognized by those of ordinary skill in the art that the telepresence system depicted in FIGS. 2A-2C, telepresence system 200, is merely one example embodiment of a telepresence system. The components depicted in FIGS. 2A and 2B and described above may be replaced, modified or substituted to fit individual needs. For example, the size of the telepresence system may be reduced to fit in a smaller space, or it may use one, two, or four or more sets of cameras, display monitors, microphones, and loudspeakers. Furthermore, while FIGS. 2A and 3B only depicts a single user within each user section, it is within the scope of particular embodiments for there to be multiple users sitting within any given user section and thus within the field of vision of a camera and displayed on the display monitor. As another example, display monitors 113 may be replaced by blank screens for use with projectors.

Figure 8:
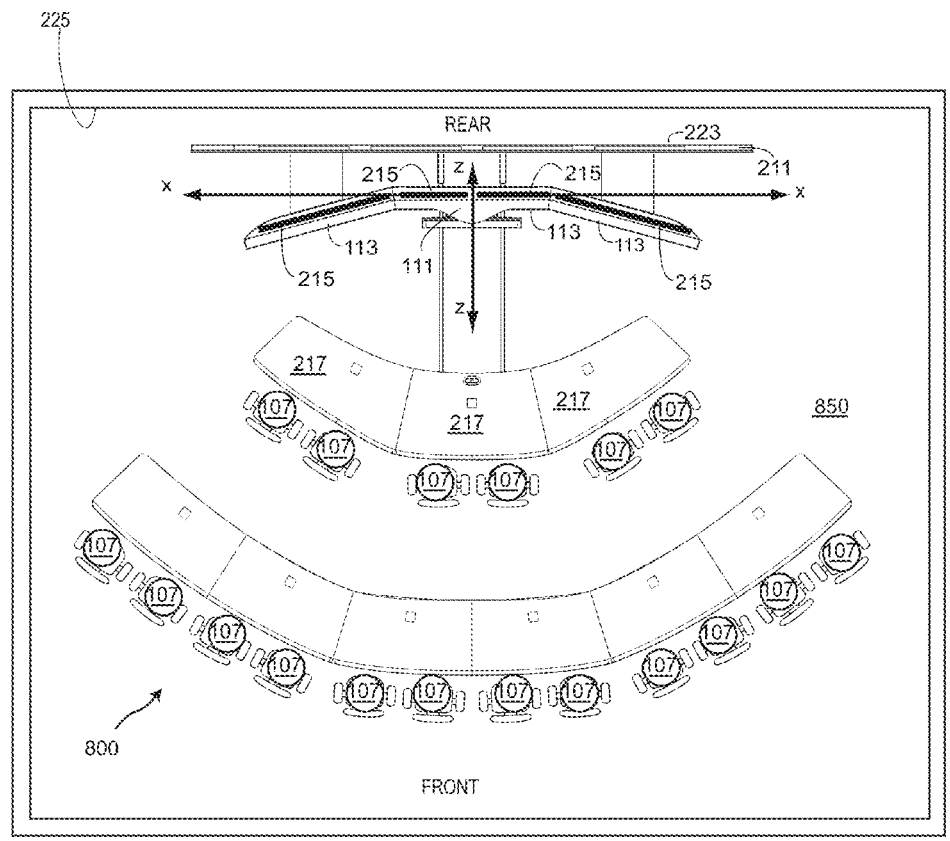
FIG. 8 shows a top view of an embodiment of a telepresence system in a space that can accommodate many more participants than the telepresence system of FIGS. 2A-2C.

FIG. 8 shows a top view of an embodiment of a telepresence system 800 in a space 850 that can accommodate many more participants than the telepresence system 200 of FIGS. 2A-2C. Several elements of telepresence system 800 are the same as for telepresence system 200 of FIGS. 2A-2C, including the display monitors 113, the cameras 111, the light source 215, the panel 211 having the reflective front surface 221, and the front tables 217. Telepresence system 800 can accommodate up to 18 participants 107.

Reference throughout this specification to "one embodiment," "an embodiment," "some embodiments," or "embodiments" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

In addition, use of the "a" or "an" are used to describe elements and components of the embodiments herein. This is done merely for convenience and to give a general sense of the invention. This description should be read to include one or at least one and the singular also includes the plural unless it is obvious that it is meant otherwise.

The present invention contemplates great flexibility in the arrangement and design of elements within a telepresence system as well as their internal components. Numerous other changes, substitutions, variations, alterations and modifications may be ascertained by those skilled in the art and it is intended that the present invention encompass all such changes, substitutions, variations, alterations and modifications as falling within the spirit and scope of the appended claims.

We claim:

1. An apparatus comprising:
 a planar panel having a vertical height, a transverse width, and a longitudinal thickness, the planar panel having a rear surface and a reflective front surface, the planar panel for placement in a space the space having a floor, a front, a rear, and sides, the space having a longitudinal horizontal axis from front-to-rear, a transverse horizontal axis perpendicular to the longitudinal horizontal axis, and a vertical axis, the planar panel for placement parallel to the transverse horizontal axis at a pre-defined distance rearward from a light source positioned in the space at a light source position, including a light source height from the floor, the light source operative to shine light rearward in a plurality of directions, wherein the reflective front surface includes indentations that are shaped in depth to direct light from the light source frontwards towards one or more participants of a teleconference when the light source and the planar panel are placed in the space, the participants sitting at a table frontwards of the panel viewing one or more display monitors located between the planar panel and the participants, display monitors operative to display respective images to the one or more participants.

2. The apparatus of claim 1, wherein the light source comprises one or more light bars directing light rearward from behind the one or more display monitors, and wherein the indentations comprise vertically stacked horizontal channels having a width in the vertical direction, and a variable depth in the longitudinal direction, the depth varying with height, at least some of the channels differing from channel to channel, the variation of the respective variable depths of the channels that differ from channel to channel calculated to reflect and direct, in inclination, the light from the light source frontwards towards the one or more participants.

3. The apparatus of claim 2, wherein the indentations further comprise indentations having a variable depth in the transverse direction, the depth varying with transverse distance, the varying calculated to reflect and direct, in azimuth, the light from the light source frontwards towards the one or more participants.

4. The apparatus of claim 2, wherein the reflective front surface includes an additional set of vertically stacked horizontal channels whose shape in cross-section does not vary from channel to channel, the additional set located up to a pre-defined height of the reflective front surface, such that the channels that differ from channel are above the pre-defined height.

5. The apparatus of claim 2, wherein the variable depth channels that differ from channel to channel are operative to cause the light from the light source to be reflected as parallel rays at a predefined inclination towards the participants.

6. The apparatus of claim 5, wherein the pre-defined inclination is 0°.

7. The apparatus of claim 5, wherein at least some of the variable depth channels that differ from channel to channel are higher than the expected respective heights of respective faces of the one or more participants, and wherein the pre-defined inclination is 10° downward.

8. The apparatus of claim 5, wherein the variable depth channels that differ from channel to channel include channels that each has a cross-sectional shape in the longitudinal-vertical plane comprising a segment of a parabola.

9. The apparatus of claim 5, wherein the variable depth channels that differ from channel to channel include channels that each has a cross-sectional shape in the longitudinal-vertical plane comprising a straight line approximating a segment of a parabola.

10. The apparatus of claim 2, wherein the variable depth channels that differ from channel to channel are operative to cause the light from the light source to be directed towards a horizontal line extending parallel to the transverse axis, at a longitudinal direction where the head of a typical participant is likely to be location, and at a pre-defined height at which the head of the typical participant is likely to be located when the typical participant is sitting at the table.

11. The apparatus of claim 10, wherein the horizontal line is directly above the front edge of a table that is parallel to the transverse axis at a pre-defined height.

12. The apparatus of claim 10, wherein each channel of the variable depth channels that differ from channel to channel has a shape in longitudinal-vertical cross-section comprising a segment of an ellipse that has a first focus and a second focus, the first focus at the point of the light source longitudinal-vertical cross-section, and the second focus at the point of the horizontal line in the longitudinal-vertical cross-section.

13. The apparatus of claim 12, wherein for each channel, the segment of the ellipse is approximated by a straight line segment.

14. An apparatus comprising:

one or more display monitors in a space having a floor, a front, a rear, and sides, the space having a longitudinal horizontal axis from front-to-rear, a transverse horizontal axis perpendicular to the longitudinal horizontal axis, and a vertical axis;

a table in front of the one or more monitors arranged such that one or more participants can view the one or more monitors;

at least one video camera aimed at the one or more participants;

at least one microphone;

at least one loudspeaker;

an interface to couple the apparatus via a network or other communication link to a remote teleconference system having one or more remote participants; and a processor to control the operation and administration of the apparatus by processing information and signals received from the at least one video camera, at least one microphone, and the interfaces so as to cause the apparatus to operate as a telepresence system operative to carry out a teleconference with the one or remote participants of the remote teleconference system, wherein the apparatus further comprises:

a light source in the space, the light source at a light source position, including a light source height from the floor, the light source operative to shine light rearward in a plurality of directions;

a planar panel having a vertical height, a transverse width, and a longitudinal thickness, the planar panel having a rear surface and a reflective front surface, the planar panel being placed in the space parallel to the transverse horizontal axis at a pre-defined distance rearward from the light source and of the one or more monitors, wherein the reflective front surface includes indentations that are shaped in depth to direct light from the light source frontwards towards the one or more participants sitting at the table viewing the one or more display monitors located between the planar panel and the participants.

15. The apparatus of claim 14, wherein the light source comprises one or more light bars directing light rearward from behind the one or more display monitors, and wherein the indentations comprise vertically stacked horizontal channels having a width in the vertical direction, and a variable depth in the longitudinal direction, the depth varying with height, at least some of the channels differing from channel to channel, the variation of the respective variable depths of the channels that differ from channel to channel calculated to reflect and direct, in inclination, the light from the light source frontwards towards the one or more participants.

16. The apparatus of claim 15, wherein the variable depth channels that differ from channel to channel are operative to cause the light from the light source to be reflected as parallel rays at a predefined inclination towards the participants.

17. The apparatus of claim 15, wherein the variable depth channels that differ from channel to channel are operative to cause the light from the light source to be directed towards a horizontal line extending parallel to the transverse axis, at a longitudinal direction where the head of a typical participant is likely to be location, and at a pre-defined height at which the head of the typical participant is likely to be located when the typical participant is sitting at the table.

18. An apparatus comprising:
a light source for placement in a space, the space having a floor, a front, a rear, and sides, the space having a longitudinal horizontal axis from front-to-rear, a transverse horizontal axis perpendicular to the longitudinal horizontal axis, and a vertical axis, the light source for placement in the space at a light source position, including a light source height from the floor, the light source when placed in the space operative to shine light rearward in a plurality of directions;
a planar panel having a vertical height, a transverse width, and a longitudinal thickness, the planar panel having a rear surface and a reflective front surface, the planar panel for placement in the space parallel to the transverse horizontal axis at a pre-defined distance rearward from the light source,
wherein the reflective front surface includes indentations that are shaped in depth to direct light from the light source frontwards towards one or more participants of a teleconference when the light source and the planar panel are placed in the space, the participants sitting at a table frontwards of the panel viewing one or more display monitors located between the planar panel and the participants, display monitors operative to display respective images to the one or more participants.

19. The apparatus of claim 18,
wherein the light source comprises one or more light bars directing light rearward from behind the one or more display monitors, and
wherein the indentations comprise vertically stacked horizontal channels having a width in the vertical direction, and a variable depth in the longitudinal direction, the depth varying with height, at least some of the channels differing from channel to channel, the variation of the respective variable depths of the channels that differ from channel to channel calculated to reflect and direct, in inclination, the light from the light source frontwards towards the one or more participants.

20. The apparatus of claim 19, wherein the variable depth channels that differ from channel to channel are operative to cause the light from the light source to be reflected as parallel rays at a predefined inclination towards the participants.

21. The apparatus of claim 19, wherein the variable depth channels that differ from channel to channel are operative to cause the light from the light source to be directed towards a horizontal line extending parallel to the transverse axis, at a longitudinal direction where the head of a typical participant is likely to be located, and at a pre-defined height at which the head of the typical participant is likely to be located when the typical participant is sitting at the table.

* * * * *